US012267248B2

(12) United States Patent
Albrecht et al.

(10) Patent No.: US 12,267,248 B2
(45) Date of Patent: Apr. 1, 2025

(54) NETWORK INFRASTRUCTURE DEVICE, COMMUNICATION TERMINAL AND METHOD FOR SYNCHRONIZING CONTROL APPLICATIONS VIA A COMMUNICATION NETWORK FOR TRANSFERRING TIME-CRITICAL DATA

(71) Applicant: Siemens Aktiengesellschaft, Munich (DE)

(72) Inventors: Harald Albrecht, Nuremberg (DE); Franz-Josef Götz, Heideck (DE); Jürgen Schmitt, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 186 days.

(21) Appl. No.: 17/802,383

(22) PCT Filed: Jan. 29, 2021

(86) PCT No.: PCT/EP2021/052144
§ 371 (c)(1),
(2) Date: Aug. 25, 2022

(87) PCT Pub. No.: WO2021/170343
PCT Pub. Date: Sep. 2, 2021

(65) Prior Publication Data
US 2023/0090803 A1  Mar. 23, 2023

(30) Foreign Application Priority Data
Feb. 28, 2020  (EP) .................................. 20160114

(51) Int. Cl.
*H04L 47/283* (2022.01)
*H04L 7/00* (2006.01)
*H04L 47/80* (2022.01)

(52) U.S. Cl.
CPC .......... *H04L 47/283* (2013.01); *H04L 7/0016* (2013.01); *H04L 47/805* (2013.01)

(58) Field of Classification Search
CPC ......... H04L 47/00; H04L 7/00; H04L 7/0008; H04W 56/0015
See application file for complete search history.

(56) References Cited

U.S. PATENT DOCUMENTS 9,141,683 B1 * 9/2015 Nagargadde ........ G06F 11/1464
10,148,412 B1 * 12/2018 Chu ........................ H04L 69/28
(Continued)

FOREIGN PATENT DOCUMENTS

| CN | 1402444 | 3/2003 |
| CN | 104737476 | 6/2015 |

(Continued)

OTHER PUBLICATIONS

PCT International Search Report dated May 12, 2021 based on PCT/EP2021/052144 filed Jan. 29, 2021.

(Continued)

*Primary Examiner* — Zhiren Qin
(74) *Attorney, Agent, or Firm* — Cozen O'Connor

(57) ABSTRACT

Method for synchronizing control applications via a communication network for transferring time-critical data, wherein network infrastructure devices determine, for the forwarding of datagrams associated with selected data streams, respective time delays between a planned transmission time of the datagram and an actual transmission time of the datagram in question, where the selected data streams are assigned to control applications running on communication terminals, and where a beginning of a next end-node-side transfer cycle is determined by a starting-node-side control application based on the time delay determined by a preceding network infrastructure device in question, an accu- (Continued)

mulated maximum time delay and a transmission time of the datagrams to achieve synchronization between transfer cycles of starting-node-side control applications and transfer cycles of end-node-side control applications.

21 Claims, 4 Drawing Sheets

(56) References Cited

U.S. PATENT DOCUMENTS

| | | | |
|---|---|---|---|
| 11,018,791 B2 | 5/2021 | Götz et al. | |
| 11,316,654 B2 | 4/2022 | Weichlein | |
| 2003/0039273 A1 | 2/2003 | Jang | |
| 2004/0258097 A1* | 12/2004 | Arnold | H04J 3/0655 370/503 |
| 2005/0018626 A1* | 1/2005 | Bruckner | H04J 3/0652 370/324 |
| 2007/0268938 A1 | 11/2007 | Dowd | |
| 2009/0322510 A1* | 12/2009 | Berger | H04W 60/00 340/568.1 |
| 2011/0221485 A1 | 9/2011 | He et al. | |
| 2012/0327953 A1 | 12/2012 | Vokkarane et al. | |
| 2013/0128903 A1 | 5/2013 | Kristoffersen et al. | |
| 2014/0086136 A1* | 3/2014 | Angst | H04L 49/9089 370/312 |
| 2015/0304066 A1 | 10/2015 | Dutti et al. | |
| 2018/0295595 A1* | 10/2018 | Shellhammer | H04W 52/0229 |
| 2019/0104055 A1* | 4/2019 | Craciunas | H04L 47/28 |
| 2019/0335405 A1* | 10/2019 | Wang | H04L 25/03019 |
| 2019/0386935 A1* | 12/2019 | Back | H04L 49/205 |
| 2020/0213022 A1 | 7/2020 | Goetz et al. | |
| 2020/0393816 A1* | 12/2020 | Gruner | G05B 19/4155 |

FOREIGN PATENT DOCUMENTS

| | | |
|---|---|---|
| CN | 104753812 | 7/2015 |
| CN | 105790920 | 7/2016 |
| CN | 110431769 | 11/2019 |
| EP | 1940089 | 7/2008 |
| EP | 2421204 A2 | 2/2012 |
| EP | 3674824 | 7/2020 |
| WO | 2012146187 | 11/2012 |
| WO | 2014029430 | 2/2014 |
| WO | 2016165353 | 10/2016 |
| WO | 2018166576 | 9/2018 |

OTHER PUBLICATIONS

Liu et al. "The 3 Times Baud Rate Sampling Design for PIC Serial Asynchronous Communication", pp. 47-50, Sep. 15, 2008.
Peng et al. "Software Architecture of Automotive-Ethernet Research", A Master Thesis Submitted to University of Electronic Science and Technology of China (97 pages), Dec. 15, 2019.
Kong et al. "The Synchronization Techniques for Redundancy Architecture Based on CAN Bus", Nanjing University of Aeronautics and Astronautics, Nanjing 210016, China, pp. 43-47, Mar. 15, 2013.

* cited by examiner

NETWORK INFRASTRUCTURE DEVICE, COMMUNICATION TERMINAL AND METHOD FOR SYNCHRONIZING CONTROL APPLICATIONS VIA A COMMUNICATION NETWORK FOR TRANSFERRING TIME-CRITICAL DATA

CROSS-REFERENCE TO RELATED APPLICATIONS

This is a U.S. national stage of application No. PCT/EP2021/052144 filed 29 Jan. 2021. Priority is claimed on European Application No. 20160114.3 filed 28 Feb. 2020 2011, the content of which is incorporated herein by reference in its entirety.

BACKGROUND OF THE INVENTION

1. Field of the Invention

The invention relates to industrial automation systems and, more particularly to a network infrastructure device, a communication terminal and method for synchronizing control applications via a communication network for transferring time-critical data, where the communication network comprises communication terminals at starting and end nodes of paths for data streams and network infrastructure devices at intermediate nodes.

2. Description of the Related Art

An industrial automation system normally comprises a multiplicity of automation devices networked to one another via an industrial communication network and is used for controlling or regulating installations, machines or devices within the context of production or process automation. Time-critical constraints in industrial automation systems mean that predominantly realtime communication protocols, such as PROFINET, PROFIBUS, realtime Ethernet or time-sensitive networking (TSN), are used for communication between automation devices.

Interruptions to communication connections between computer units of an industrial automation system or automation devices can lead to undesirable or unnecessary repetition of a transfer of a service request. Additionally, messages that are not transferred or incompletely transferred can prevent an industrial automation system from changing to or remaining in a safe operating state, for example. This can finally lead to failure of a complete production installation and to costly production downtime. One particular problem area in industrial automation systems regularly results from message traffic that contains relatively many but relatively short messages, which intensifies the above problems.

Use of often extremely different applications can create problems in Ethernet-based communication networks, for example, if network resources are used for transferring data streams or data frames with realtime demands in competition with transferring data frames having a large payload content without specific quality of service demands. This can lead to data streams or data frames with realtime demands not being transmitted in accordance with a demanded or required quality of service.

Prioritized transfer of data frames is fundamentally possible, for example, based on virtual local area networks (VLANs) in accordance with Institute of Electrical and Electronics Engineers (IEEE) standard 802.1Q, via appropriate tags inserted in data frames. For the purpose of synchronized and prioritized transmission of audio and video data streams (audio/video bridging) via communication networks, there is provision for bandwidth reservation for individual communication connections that have a highest assigned priority. Resources required for transmitting audio and video data streams are reserved in communication devices such as switches, in this case. However, high-priority data frames are forwarded only after a successful reservation. Bandwidth monitoring is used to ensure that there is sufficient reserved bandwidth available with regard to bandwidth that is actually used. A communication connection that uses more bandwidth than is reserved would otherwise lead to a disturbance on an entire communication network, in the worst case to the communication network being halted on account of overload.

For the secure transmission of audio and video data streams via Ethernet-based communication networks, credit-based shapers (CBSs) have been defined in accordance with IEEE standard 802.1 Qav as a measure of bandwidth monitoring. Credit-based shapers define a transmission pause after each transmitted data frame to ensure bandwidth limiting with reference to a reserved bandwidth. However, such enforced pauses can be problematic in industrial automation systems when transmitting many data frames having little payload content for control data, which are more likely to be regarded as data bundles or bursts.

For applications with increased realtime demands, a data transfer may be implemented via time-aware schedulers based on IEEE standard 802.1Qbv. A time-aware scheduler allows a data transfer within a communication network to be divided into fixed, repeating cycles based on a time-division multiplexing method (time-division multiple access (TDMA)). Within these cycles, different priorities may be managed based on a fixed pattern. This makes it possible to separate time-critical data for controlling automation devices from data without special realtime demands and thus to adhere to latency guarantees. Data transfer via time-aware schedulers fundamentally requires synchronization of clock times in all network nodes.

In accordance with IEEE standard 802.1Qcc (Stream Reservation Protocol (SRP) Enhancements and Performance Improvements), there is provision, in particular for time-sensitive networking, for terminal stations, for example, automation devices, in communication networks to be able to reserve resources necessary for transferring multicast data streams with desired quality of service parameters via reservation requests. Reservation requests are met or denied based on resources available in the communication network. Computations required for decisions relating to reservation requests are performed based on either a local or a central configuration model. In the case of the local configuration model, bridges or switches independently determine those resources that are already used elsewhere and those that are still available in each case, and accordingly inform the respective terminal station whether its reservation request can be met.

EP 1 940 089 A1 describes a method for data transfer in radio communication networks that takes into consideration delays in the data transfer. In particular, the delays over a respective transmission channel are summed. Depending on an accumulated delay, a transmission protocol is selected in order to use the selected transmission protocol to ensure a desired transmission time.

WO 2018/166576 A1 discloses a method for time-controlled data transmission of data packets in a time-sensitive network (TSN) communication system that involves transferring data packets in all of the network nodes within prescheduled time windows of identical size. The network nodes each have an independent timer of their own, which is not synchronized to timers of other network nodes. These time windows start and end at the same times for all of the network nodes. The data packets are each transmitted from one network node to a subsequent network node within a time window that follows the time window in which the respective data packet has been received from a precedent network node. Each network node uses its own timer, based on a delay value ascertained by the particular precedent network node, to determine the time at which the next time window starts or ends.

As disclosed in European patent application 18248171.3, a particular individual time window within predefined time intervals is specified for data streams associated with selected control applications running on terminals. The time windows have a particular individual cycle duration that is a multiple of a general cycle duration or corresponds to the general cycle duration. First and second communication devices check whether a specified time window is available for data transfer for each of the selected control applications. If a time window is available, information about a particular start of the time window within the predefined time intervals is transferred to the terminal upon which the respective selected control application is running. Data streams associated with selected control applications are in each case transferred in accordance with the information about the start of the individual time window.

US 2004/258097 A1 relates to a method for synchronizing nodes of a communication system in which a first synchronization telegram is received by a first node. The first synchronization telegram comprises a desired time of reception at the first node. Based on a difference between an actual time of reception ascertained on the basis of the time base and the desired time of reception, a time base of the first node is readjusted.

Communication networks for transferring time-critical data, in particular in industrial automation systems, are normally used by a multiplicity of control applications, each of which has high realtime demands. These control applications are typically independent of one another. Communication devices available hitherto support only a limited number of different synchronization domains. Accordingly, without a common time base, only a small number of control applications to be synchronized can be supported per network component.

SUMMARY OF THE INVENTION

It is an object of the present invention to provide a method for synchronizing a multiplicity of control applications via a communication network for transferring time-critical data that can be implemented with little effort, and of specifying suitable apparatuses for performing the method.

This and other objects and advantages are achieved in accordance with the invention by a network infrastructure device, a communication terminal and a method for synchronizing control applications via a communication network for transferring time-critical data, where the communication network comprises communication terminals, in particular industrial automation devices having a communication module, at starting and end nodes of paths for data streams and network infrastructure devices, in particular switches or bridges, at intermediate nodes. Selected data streams are associated with control applications running on communication terminals. The network infrastructure devices ascertain a particular time delay between a scheduled time of transmission for a datagram and its actual time of transmission when forwarding datagrams associated with the selected data streams. The communication terminals or the network infrastructure devices preferably each comprise a timer, which is independent of timers of other communication terminals or network infrastructure devices or is not synchronized to timers of other communication terminals or network infrastructure devices.

In accordance with the invention, the network infrastructure devices send particular information about the ascertained time delay to a network infrastructure device or communication terminal that is subsequent along the respective path. The network infrastructure devices compute the particular scheduled time of transmission based on a time of reception of the datagrams and a time delay ascertained by a communication terminal or network infrastructure device that is precedent along the respective path. In addition, an accumulated maximum time delay between starting nodes and end nodes of the respective path is ascertained for a transmission of the selected data streams. The accumulated maximum time delay is preferably ascertained for a reservation of resources to be provided by the network infrastructure devices for the transmission of the selected data streams.

Synchronization between transmission cycles of starting-node control applications and transmission cycles of end-node control applications is achieved in accordance with the invention by virtue of the starting-node control application taking the time delay ascertained by the precedent network infrastructure device, the accumulated maximum time delay and a time of transmission of the datagrams as a basis for ascertaining a particular start of a next end-node transmission cycle. This allows relatively simple synchronization of a group of terminals via a common data stream without the need for separate synchronization protocols or domains.

The datagrams associated with the selected data streams are advantageously tagged Ethernet data frames. The network infrastructure devices send the information about the ascertained time delay to the network infrastructure device or communication terminal that is subsequent along the respective path in a particular tag of the respective Ethernet data frame. This allows simple implementation of the present invention based on existing communication protocol elements. The communication terminals at the starting nodes or the starting-node control applications preferably send particular information about the time of transmission of the datagrams by the respective starting-node control application in a payload area of the respective datagram. In addition, in particular, the communication terminals at the end nodes or the end-node control applications can ascertain the particular start of the next end-node transmission cycle.

In accordance with a preferred embodiment of the present invention, a particular maximum input-side time delay between the time of reception of datagrams and the scheduled time of transmission is ascertained or predefined for the communication terminals at end nodes and the network infrastructure devices. Analogously, a particular maximum output-side time delay between the scheduled time of transmission of datagrams and the scheduled time of transmission may also be ascertained or predefined for the communication terminals at starting nodes and the network infrastructure devices. In particular, datagrams may be rejected as soon as the maximum input-side or output-side time delay is exceeded. This makes it possible to ensure that no system resources are allocated for transferring control or status data that are no longer current.

In addition, a particular maximum transmission delay is advantageously computed, measured or predefined for transmission links between communication terminals or network infrastructure devices. The accumulated maximum time delay is preferably a sum of all maximum input-side time delays, maximum output-side time delays and maximum transmission delays along a path for a selected data stream. The start of the particular next end-node transmission cycle may therefore be ascertained efficiently and quickly.

In accordance with a further advantageous embodiment of the present invention, the communication terminals at starting nodes and the network infrastructure devices send particular information about their maximum output-side time delay to the network infrastructure device or communication terminal that is subsequent along the respective path. The network infrastructure devices are therefore able to compute the particular scheduled time of transmission with little effort from the time of reception of the datagrams, plus the maximum output-side time delay of the precedent communication terminal or network infrastructure device and the maximum input-side time delay, and minus the time delay ascertained by the precedent communication terminal or network infrastructure device.

In particular, based on the above-explanations, the particular start of the next end-node transmission cycle is preferably ascertained from the time of transmission of the datagrams by the respective starting-node control application, plus the accumulated maximum time delay and the time delay ascertained by the precedent network infrastructure device, and minus the time of reception of the datagrams by the communication terminals at the end nodes, and the maximum output-side time delay of the precedent network infrastructure device.

The communication terminals at starting nodes and the network infrastructure devices advantageously accomplish this by sending particular information about the maximum output-side time delay to the network infrastructure device or communication terminal that is subsequent along the respective path via a message based on the Simple Network Management Protocol. This allows the start of the particular next end-node transmission cycle to be ascertain in a rapid and reliable manner.

In accordance with a further advantageous embodiment of the present invention, the communication terminals at the starting nodes reserve resources to be provided by the network infrastructure devices for a transmission of a data stream by sending first messages, which specify particular quality of service parameters for the respective data stream, where the quality of service parameters comprise maximum latencies. These first messages may in particular be Talker Advertise messages. The communication terminals at the end nodes send second messages for a reservation request, where the second messages specify a particular data stream identifier associated with the respective communication terminal sending a first message.

These second messages may in particular be Listener Ready messages. Resources reserved for the transmission of the data stream include, by way of example, usable transmission time windows, bandwidth, assured maximum latency, number of queues, queue cache or address cache in switches or bridges.

Preferably, for a particular reservation request based on the first and second messages, the network infrastructure devices check whether the network infrastructure devices along the respective path have sufficient resources available for transmitting the data stream while adhering to the specified quality of service parameters. If there are sufficient resources, then configuration control units of the network infrastructure devices along the path ascertain particular configuration information for the data stream and configure the respective network infrastructure device to provide resources for the data stream in accordance with the ascertained configuration information. The present disclosed embodiment of the invention may thus be used with a local model for resource reservation for data streams.

In accordance with an alternative embodiment of the present invention, for a particular reservation request based on the first and second messages, a superordinate communication control device, such as a centralized network controller or a network management engine, checks whether the network infrastructure devices along the respective path have sufficient resources available for transmitting the data stream while adhering to the specified quality of service parameters. If there are sufficient resources, then the superordinate communication control device ascertains particular configuration information for the network infrastructure devices along the path for the data stream and configures the respective network infrastructure devices to provide resources for the data stream in accordance with the ascertained configuration information. In this way, it is also possible for the disclosed present embodiment of the invention to be used with a central model for resource reservation for data streams.

The network infrastructure device in accordance with the invention is intended to implement a method in accordance with the disclosed embodiments and comprises multiple connections for connection to further communication devices and also a coupling element via which the connections are switchably connectable to one another. The network infrastructure device is configured to ascertain a particular time delay between a scheduled time of transmission for a datagram and its actual time of transmission when forwarding datagrams associated with selected data streams. The selected data streams are associated with control applications running on communication terminals. Furthermore, the network infrastructure device is configured to send particular information about the ascertained time delay to a network infrastructure device or communication terminal that is subsequent along a path for a selected data stream. In addition, the network infrastructure device is configured to compute the scheduled time of transmission based on a particular time of reception of the datagrams and a time delay ascertained by a communication terminal or network infrastructure device that is precedent along the respective path.

The communication terminal in accordance with the invention is intended to implement a method in accordance with the disclosed embodiments and is configured to achieve synchronization between transmission cycles of starting-node control applications and transmission cycles of end-node control applications by virtue of the starting-node control application taking a time delay ascertained by a precedent network infrastructure device along a path for a selected data stream, an accumulated maximum time delay between starting nodes and end nodes of the respective path and a time of transmission of datagrams associated with the selected data stream as a basis for ascertaining a particular start of a next end-node transmission cycle. The accumulated maximum time delay is ascertained for a transmission of the selected data stream.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained more thoroughly below using an exemplary embodiment with reference to the drawing, in which.

DETAILED DESCRIPTION OF THE EXEMPLARY EMBODIMENTS

Figure 1:
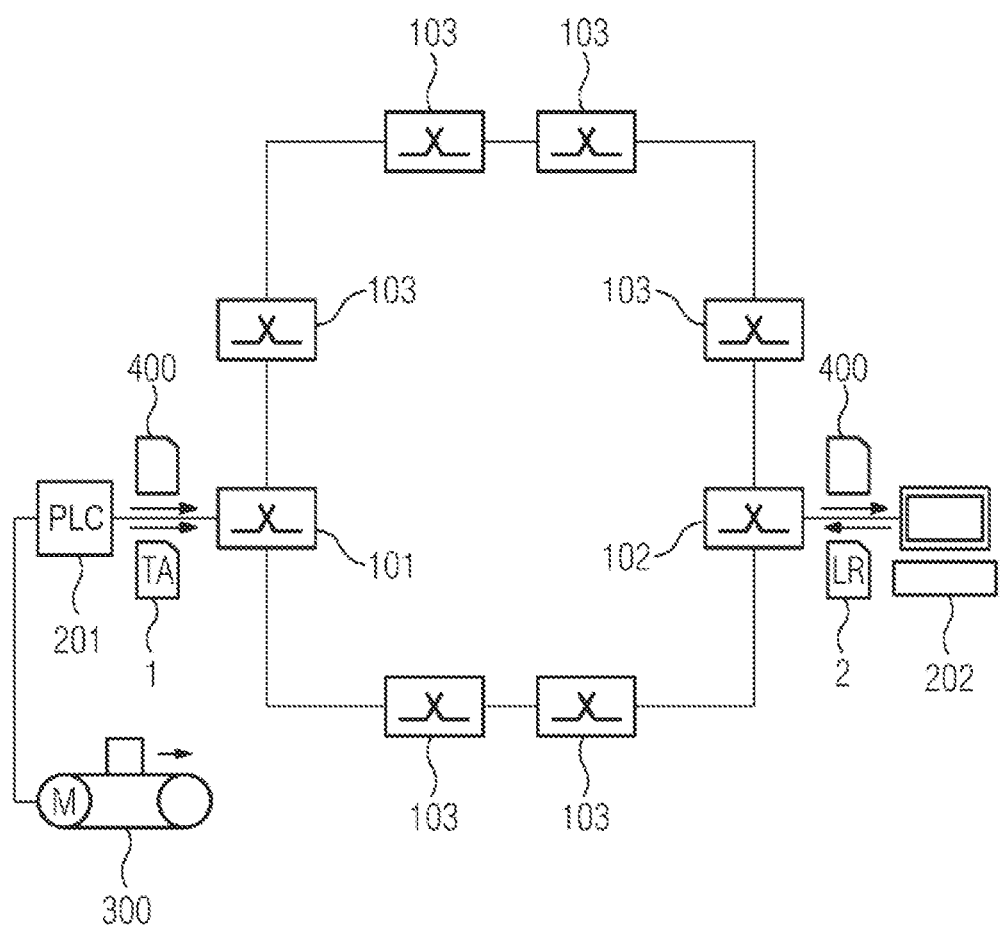
FIG. 1 is a schematic illustration of a communication network for an industrial automation system, comprising multiple communication devices in accordance with the invention.

The communication network for an industrial automation system that is shown in FIG. 1 comprises multiple communication devices, in particular network infrastructure devices 101-103 and communication terminals integrated in automation devices 201-202. By way of example, the network infrastructure devices 101-103 may be bridges, switches or routers and used for connecting automation devices, such as programmable logic controllers 201, input/output units (I/O modules) or operating and observation stations 202. In the present exemplary embodiment, the communication network comprising the network infrastructure devices 101-103 is configured as a time-sensitive network, in particular in accordance with IEEE 802.1Q, IEEE 802.1AB, IEEE 802.1AS, IEEE 802.1BA or IEEE 802.1CB.

Programmable logic controllers 201 typically each comprise a communication module, a central processing unit and at least one input/output unit. Input/output units may fundamentally also be configured as local peripheral modules arranged remotely from a programmable logic controller. The communication module connects a programmable logic controller 201 to a switch or router or additionally to a field bus, for example. The input/output unit is used for interchanging control variables and measured variables between the programmable logic controller 201 and a machine or apparatus 300 controlled by the programmable logic controller 201. The central processing unit is intended in particular for ascertaining suitable control variables from captured measured variables. The above components of the programmable logic controller 201 are connected to one another via a backplane bus system in the present exemplary embodiment.

An operating and observation station 202 is used to visualize process data or measured and control variables that are processed or captured by programmable logic controllers, input/output units or sensors. In particular, an operating and observation station 202 is used to display values of a control loop and to alter control parameters. Operating and observation stations 202 comprise at least one graphical user interface, an input device, a processor unit and a communication module.

First automation devices, which are communication terminals connected to starting nodes and have a talker function, are used to provide information or services via data streams for use on second automation devices, which are communication terminals connected to end nodes and have a listener function. An automation device may have both a talker function and a listener function simultaneously, for example, if it firstly provides automation services and secondly uses automation services of other devices.

In the present exemplary embodiment, the programmable logic controller 201 has a talker function, whereas the operating and observation station 202 has a listener function and in particular receives information provided by the programmable logic controller 201. In principle, the operating and observation station 202 could analyse information received from the programmable logic controller 201 and could use this information to predefine control parameters for the programmable logic controller 201. The programmable logic controller 201 and the operating and observation station would therefore perform both functions. To simplify illustration, it is assumed below that both devices each have just one associated function.

Datagrams 400 selected in the present exemplary embodiment are transferred as data streams from communication terminals 201 at starting nodes to communication terminals 202 at end nodes via network infrastructure devices 101-103 at intermediate nodes. The communication terminals 201-202 and the network infrastructure devices 101-103 each comprise a timer, which is independent of timers of other communication terminals or network infrastructure devices and is not synchronized to timers of other communication terminals or network infrastructure devices.

To reserve resources to be provided by the network infrastructure devices 101-103, the communication terminals at the starting nodes, such as the programmable logic controller 201, specify particular quality of service parameters for the data streams via Talker Advertise messages 1 as part of data stream registration. These quality of service parameters particularly comprise maximum latencies specified for the respective data stream. The resources to be provided by the network infrastructure devices 101-103 comprise, by way of example, usable transmission time windows, bandwidth, assured maximum latency, number of queues, queue cache or address cache in switches or bridges. If data stream registration is successful or specified quality of service demands are fundamentally able to be met, then a data stream identifier is allocated in each case. For a reservation request, the communication terminals at the end nodes, for example, the operating and observation station 202, specify a respective data stream identifier and send Listener Ready messages 2 in this regard.

In accordance with a local approach for reserving resources for transferring data streams, each network infrastructure device 101-103 along a path for a data stream takes the quality of service parameters as a basis for checking, for a particular reservation request, whether the respective network infrastructure device has sufficient resources available for transferring data while adhering to the specified quality of service parameters. A central entity for resource management or path ascertainment is not required with the local approach for reserving resources for data streams. The paths for the data streams may be ascertained via shortest path bridging in accordance with IEEE 802.1aq, for example. If there are sufficient resources, a particular data stream multicast address associated with the specified data stream identifier is transferred to a requesting communication terminal at an end node. Additionally, if there are sufficient resources, configuration control units of the communication devices along a path for a data stream ascertain particular configuration information and configure the respective network infrastructure device to provide resources for the data streams in accordance with the ascertained configuration information.

By contrast, for a particular reservation request in accordance with a central approach for reserving resources, a superordinate communication control device takes the Talker Advertise messages 1 and the Listener Ready messages 2 as a basis for checking whether the network infrastructure devices 101-103 along the respective path have sufficient resources available for transmitting the data stream while adhering to the specified quality of service parameters. If there are sufficient resources, then the superordinate communication control device ascertains particular configuration information for the network infrastructure devices 101-103 along the path for the data stream and configures the respective network infrastructure devices to provide resources for the data stream in accordance with the ascertained configuration information.

Figure 2:
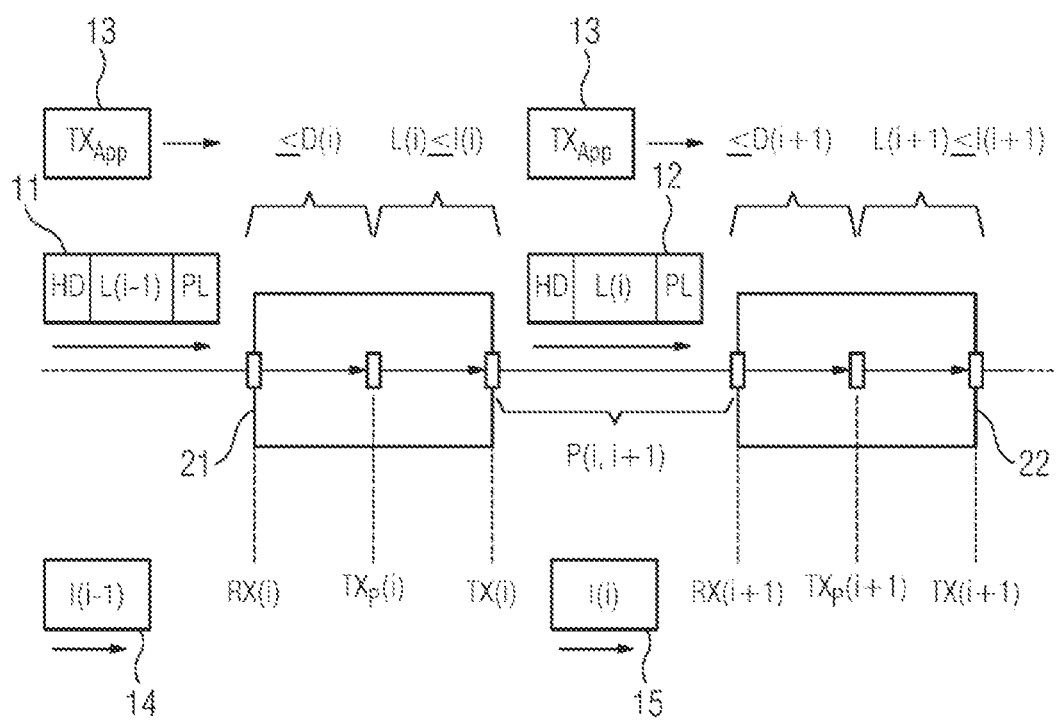
FIG. 2 shows a schematic representation of a transfer of data streams and synchronization information between communication devices at intermediate nodes of the communication network of FIG. 1.
Figure 3:
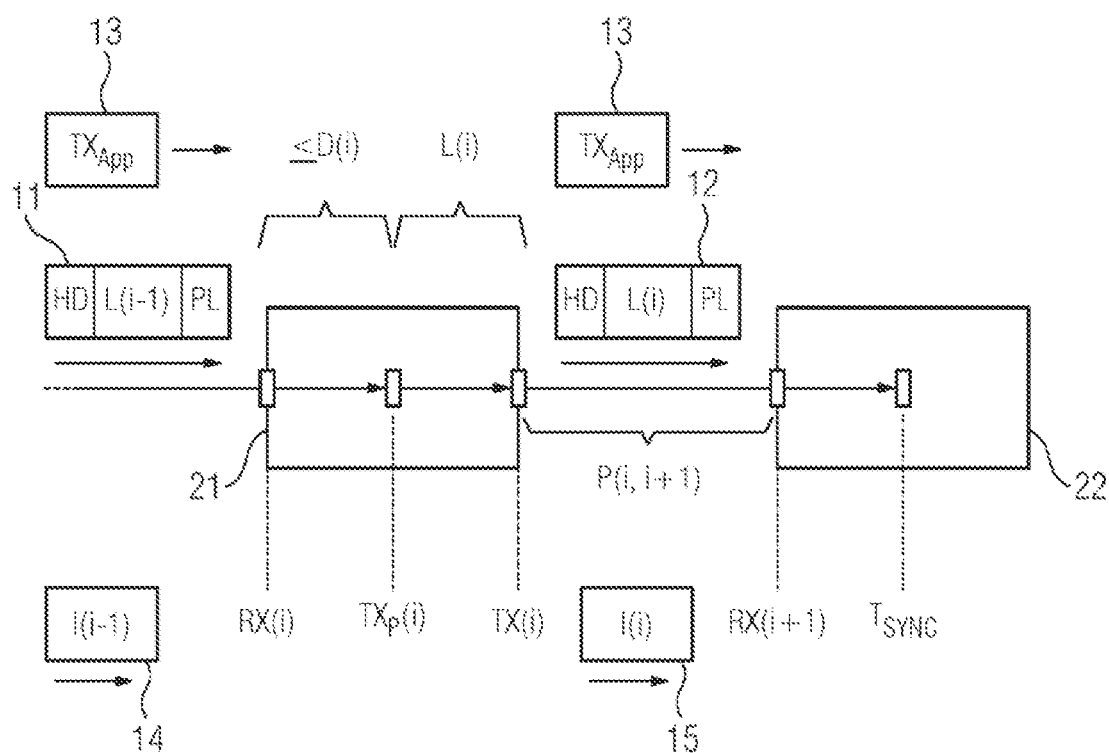
FIG. 3 shows a schematic representation of a transfer of data streams and synchronization information to a communication device at an end node of the communication network of FIG. 1.

Control applications running on communication terminals or automation devices 201-202 are synchronized by using selected data streams associated with the control applications. In accordance with FIGS. 2 and 3, the network infrastructure devices 101-103 ascertain a particular time delay $L(i)$, $L(i+1)$ between a scheduled time of transmission $TX_P(i)$, $TX_P(i+1)$ for a datagram 11, 12 and its actual time of transmission $TX(i)$, $TX(i+1)$ when forwarding datagrams 11-12 associated with the selected data streams within a respective time window 21, 22. The network infrastructure devices 101-103 send particular information about the ascertained time delay $L(i)$, $L(i+1)$ to a network infrastructure device 101-103 or communication terminal 202 that is subsequent along the respective path. The network infrastructure devices 101-103 compute the scheduled time of transmission $TX_P(i)$, $TX_P(i+1)$ based on a particular time of reception $RX(i)$, $RX(i+1)$ of the datagrams 11-12 and based on a time delay $L(i-1)$, $L(i)$ ascertained by a communication terminal 201 or network infrastructure device 101-103 that is precedent along the respective path.

The datagrams 11-12 associated with the selected data streams are preferably tagged Ethernet data frames, which comprise tag fields besides a header HD and a payload block PL. The network infrastructure devices 101-103 send the information about the ascertained time delay $L(i)$, $L(i+1)$ to the network infrastructure device 101-103 (see FIG. 2) or communication terminal 202 (see FIG. 3) that is subsequent along the respective path in a particular tag of the respective Ethernet data frame.

In addition, an accumulated maximum time delay $D_{MAX}$ for the transmission of the selected data streams is ascertained in the present exemplary embodiment for a reservation of resources to be provided by the network infrastructure devices 101-103 for a transmission of the selected data streams. Synchronization between transmission cycles of starting-node control applications and transmission cycles of end-node control applications is achieved by virtue of the respective communication terminal or automation device 202 at an end node or the respective end-node control application taking the time delay $L(i)$ ascertained by the precedent network infrastructure device 101-103, the accumulated maximum time delay $D_{MAX}$ and a time of transmission TXAPP of the datagrams 11-12 by the starting-node control application as a basis for ascertaining a particular start ($T_{SYNC}$) of a next end-node transmission cycle (see FIG. 3). By way of example, the respective communication terminal or automation device 201 at a starting node or the starting-node control application may, to this end, send particular information about the time of transmission TXAPP of the datagrams 11-12 by the respective starting-node control application in a payload block PL of the respective datagram 11, 12 or in a separate message 13.

Preferably, a particular maximum input-side time delay $D(i)$, $D(i+1)$ between the time of reception $RX(i)$, $RX(i+1)$ of datagrams 11-12 and the scheduled time of transmission $TX_P(i)$, $TX_P(i+1)$ is ascertained or predefined for the communication terminals at end nodes and the network infrastructure devices. Analogously, a particular maximum output-side time delay $I(i)$, $I(i+1)$ between the scheduled time of transmission $TX_P(i)$, $TX_P(i+1)$ of datagrams 11-12 and the actual time of transmission $TX(i)$, $TX(i+1)$ is advantageously ascertained or predefined for the communication terminals at starting nodes and the network infrastructure devices. In addition, in the present exemplary embodiment, a particular maximum transmission delay $P(i, i+1)$ is computed, measured or predefined for transmission links between communication terminals or network infrastructure devices. These specifications may be used to compute the accumulated maximum time delay $D_{MAX}$ as the sum of all maximum input-side time delays $D(i)$, maximum output-side time delays $I(i)$ and maximum transmission delays $P(i, i+1)$ along a path for a selected data stream. Advantageously, the communication terminals at starting nodes and the network infrastructure devices send particular information about the maximum output-side time delay $I(i-1)$, $I(i)$ to the network infrastructure device or communication terminal that is subsequent along the respective path via a message 14, 15 based on the Simple Network Management Protocol (SNMP).

In the present exemplary embodiment, the communication terminals at starting nodes and the network infrastructure devices send a particular message 14, 15 containing their maximum output-side time delay $I(i-1)$, $I(i)$ to the network infrastructure device or communication terminal that is subsequent along the respective path. The network infrastructure devices therefore compute the particular scheduled time of transmission $TX_P(i)$, $TX_P(i+1)$ from the time of reception $RX(i)$, $RX(i+1)$ of the datagrams 11, 12, plus the maximum output-side time delay $I(i-1)$, $L(i)$ of the precedent communication terminal or network infrastructure device and plus the maximum input-side time delay $D(i)$, $D(i+1)$ and minus the time delay $L(i-1)$, $L(i)$ ascertained by the precedent communication terminal or network infrastructure device.

The particular start TSYNC of the next end-node transmission cycle may be ascertained on the basis of the above explanations from the time of transmission TXAPP of the datagrams 11, 12 by the respective starting-node control application, plus the accumulated maximum time delay $D_{MAX}$ and plus the time delay $L(i-1)$, $L(i)$ ascertained by the precedent network infrastructure device and and minus the time of reception of the datagrams $RX(i)$, $RX(i+1)$ by the communication terminals at the end nodes and minus the maximum output-side time delay $I(i-1)$, $I(i)$ of the precedent network infrastructure device.

Figure 4:
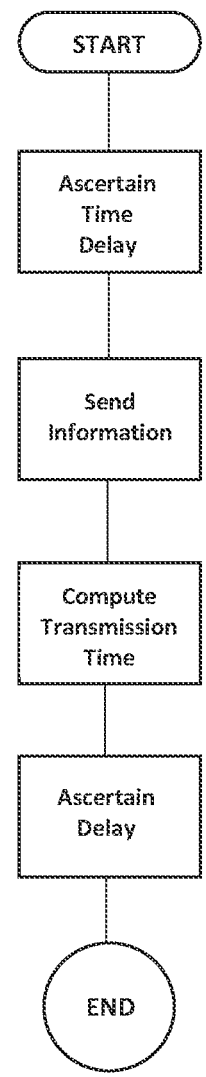
FIG. 4 shows a flowchart of the method in accordance with the invention.

FIG. 4 is a flowchart of the method for synchronizing control applications via a communication network for transferring time critical data, where the communication network comprises communication terminals 201-203 at starting and end nodes of paths for data streams and network infrastructure devices 101-103 at intermediate nodes, and selected data streams being associated with control applications running on communication terminals 201, 202.

The method comprises ascertaining, by the network infrastructure devices, a particular time delay L(i) between a scheduled time of transmission TXP(i) for a datagram and an actual time of transmission TX(i) of the datagram when forwarding datagrams 11-12 associated with the selected data streams, as indicated in step 410.

Next, the network infrastructure devices send particular information about the ascertained particular time delay to a network infrastructure device or communication terminal which is subsequent along a respective path, as indicated in step 420.

Next, the network infrastructure devices compute the scheduled time of transmission TXP(i) based on a particular time of reception RX(i) of the datagrams and a time delay L(i−1) ascertained by a communication terminal or network infrastructure device which is precedent along the respective path, as indicated in step 430.

Next, an accumulated maximum time delay DMAX between starting nodes and end nodes is ascertained for a transmission of the selected data streams, as indicated in step 440.

In accordance with the method of the invention, synchronization between transmission cycles of starting-node control applications and transmission cycles of end-node control applications is achieved by virtue of the starting-node control application taking the time delay ascertained by the precedent network infrastructure device, the accumulated maximum time delay and a time of transmission TXAPP of the datagrams as a basis for ascertaining a particular start TSYNC of a next end node transmission cycle.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for synchronizing control applications via a communication network for transferring time-critical data, the communication network comprising a respective communication at a respective starting node and a respective end node of paths for data streams and network infrastructure devices at intermediate nodes, and selected data streams being associated with control applications running on communication terminals, the method comprising:
ascertaining, by the network infrastructure devices, a particular time delay between a scheduled time of transmission for a datagram and an actual time of transmission of the datagram when forwarding datagrams associated with the selected data streams;
sending, by the network infrastructure devices, particular information about the ascertained particular time delay to a network infrastructure device or a communication terminal which is subsequent along a respective path;
computing, by the network infrastructure devices, the scheduled time of transmission based on a particular time of reception of the datagrams and a time delay ascertained by a communication terminal or a network infrastructure device which is precedent along the respective path;
ascertaining an accumulated maximum time delay between starting nodes and end nodes for a transmission of the selected data streams;
wherein synchronization between transmission cycles of starting-node control applications and transmission cycles of end-node control applications is achieved by virtue of the starting-node control application taking the time delay ascertained by the precedent network infrastructure device, the accumulated maximum time delay and a time of transmission of the datagrams as a basis for ascertaining a particular start of a next end-node transmission cycle; and
wherein the communication terminals and the network infrastructure devices each comprise a timer which is independent of timers of other communication terminals or network infrastructure devices and which is not synchronized to timers of other communication terminals or other network infrastructure devices.

2. The method as claimed in claim 1, wherein at least one of the communication terminals and network infrastructure devices each comprise a timer, which is independent of timers of other communication terminals and/or network infrastructure devices and/or is not synchronized to timers of other communication terminals and/or network infrastructure devices.

3. The method as claimed in claim 2, wherein the accumulated maximum time delay is ascertained for a reservation of resources to be provided by network infrastructure devices for the transmission of the selected data streams.

4. The method as claimed in claim 2, wherein a particular maximum input-side time delay between the time of reception of datagrams and the scheduled time of transmission is ascertained or predefined for the communication terminals at end nodes and the network infrastructure devices;
wherein a particular maximum output-side time delay between the scheduled time of transmission of datagrams and the time of transmission is ascertained or predefined for the communication terminals at starting nodes and the network infrastructure devices;
wherein a particular maximum transmission delay is computed, measured or predefined for transmission links between at least one of communication terminals and network infrastructure devices; and
wherein the accumulated maximum time delay is a sum of all maximum input-side time delays, maximum output-side time delays and maximum transmission delays along a path for a selected data stream.

5. The method as claimed in claim 1, wherein the accumulated maximum time delay is ascertained for a reservation of resources to be provided by network infrastructure devices for the transmission of the selected data streams.

6. The method as claimed in claim 5, wherein a particular maximum input-side time delay between the time of reception of datagrams and the scheduled time of transmission is ascertained or predefined for the communication terminals at end nodes and the network infrastructure devices;

wherein a particular maximum output-side time delay between the scheduled time of transmission of datagrams and the time of transmission is ascertained or predefined for the communication terminals at starting nodes and the network infrastructure devices;

wherein a particular maximum transmission delay is computed, measured or predefined for transmission links between at least one of communication terminals and network infrastructure devices; and wherein the accumulated maximum time delay is a sum of all maximum input-side time delays, maximum output-side time delays and maximum transmission delays along a path for a selected data stream.

7. The method as claimed in claim 5, wherein the particular start of the next end-node transmission cycle is ascertained from (i) the time of transmission of the datagrams by the respective starting-node control application, (ii) plus the accumulated maximum time delay, (iii) the time delay ascertained by the precedent network infrastructure device, (iv) minus the time of reception of the datagrams by the communication terminals at the end nodes and (v) the maximum output-side time delay of the precedent network infrastructure device.

8. The method as claimed in claim 5, wherein the communication terminals at starting nodes and the network infrastructure devices send particular information about the maximum output-side time delay to the network infrastructure device or communication terminal which is subsequent along the respective path via a message based on the Simple Network Management Protocol.

9. The method as claimed in claim 1, wherein a particular maximum input-side time delay between the time of reception of datagrams and the scheduled time of transmission is ascertained or predefined for the communication terminals at end nodes and the network infrastructure devices;

wherein a particular maximum output-side time delay between the scheduled time of transmission of datagrams and the time of transmission is ascertained or predefined for the communication terminals at starting nodes and the network infrastructure devices;

wherein a particular maximum transmission delay is computed, measured or predefined for transmission links between at least one of communication terminals and network infrastructure devices; and wherein the accumulated maximum time delay is a sum of all maximum input-side time delays, maximum output-side time delays and maximum transmission delays along a path for a selected data stream.

10. The method as claimed in claim 9, wherein the communication terminals at starting nodes and the network infrastructure devices send particular information about their maximum output-side time delay to the network infrastructure device or communication terminal that is subsequent along the respective path; and wherein the network infrastructure devices compute the particular scheduled time of transmission from (i) the time of reception of the datagrams, (ii) plus the maximum output-side time delay of the precedent communication terminal or network infrastructure device, (iii) the maximum input-side time delay and (iv) minus the time delay ascertained by the precedent communication terminal or network infrastructure device.

11. The method as claimed in claim 10, wherein the particular start of the next end-node transmission cycle is ascertained from (i) the time of transmission of the datagrams by the respective starting-node control application, (ii) plus the accumulated maximum time delay, (iii) the time delay ascertained by the precedent network infrastructure device, (iv) minus the time of reception of the datagrams by the communication terminals at the end nodes and (v) the maximum output-side time delay of the precedent network infrastructure device.

12. The method as claimed in claim 9, wherein the particular start of the next end-node transmission cycle is ascertained from (i) the time of transmission of the datagrams by the respective starting-node control application, (ii) plus the accumulated maximum time delay, (iii) the time delay ascertained by the precedent network infrastructure device, (iv) minus the time of reception of the datagrams by the communication terminals at the end nodes and (v) the maximum output-side time delay of the precedent network infrastructure device.

13. The method as claimed in claim 1, wherein the datagrams associated with the selected data streams are tagged Ethernet data frames; and wherein network infrastructure devices send the information about the ascertained time delay to the network infrastructure device or communication terminal which is subsequent along the respective path in a particular tag of the respective Ethernet data frame.

14. The method as claimed in claim 1, wherein the communication terminals at the starting nodes or the starting-node control applications send particular information about the time of transmission of the datagrams by the respective starting-node control application in a payload area of the respective datagram.

15. The method as claimed in claim 1, wherein the communication terminals at the end nodes or the end-node control applications ascertain the particular start of the next end-node transmission cycle.

16. The method as claimed in claim 1, wherein the communication terminals at the starting nodes reserve resources to be provided by the network infrastructure devices for a transmission of a data stream by sending first messages comprising Talker Advertise messages which specify particular quality of service parameters for the respective data stream, said quality of service parameters comprising maximum latencies; and wherein the communication terminals at the end nodes send second messages comprising Listener Ready messages for a reservation request, said second messages specifying a particular data stream identifier associated with the respective communication terminal sending a first message.

17. The method as claimed in claim 16, wherein, the network infrastructure devices check whether the network infrastructure devices along the respective path have sufficient resources available for transmitting the data stream while adhering to the specified quality of service parameters for a particular reservation request based on the first and second messages; and wherein configuration control units of the network infrastructure devices along the path ascertain particular configuration information for the data stream and configure the respective network infrastructure device to provide resources for the data stream in accordance with the ascertained configuration information, if sufficient resources exist.

18. The method as claimed in claim 16, wherein a superordinate communication control device checks whether the network infrastructure devices along the respective path have sufficient resources available for transmitting the data stream while adhering to the specified quality of service parameters for a particular reservation request based on the first and second messages; and wherein the superordinate communication control device ascertains particular configuration information for the network infrastructure devices along the path for the data stream and configures the respective network infrastructure devices to provide resources for the data stream in accordance with the ascertained configuration information if sufficient resources exist.

19. The method as claimed in claim 16, wherein resources reserved for the transmission of the data streams include at least one of usable transmission time windows, bandwidth, assured maximum latency, number of queues, queue cache and address cache in switches or bridges.

20. A network infrastructure device, comprising:
a plurality of connections for connection to further communication devices;
a coupling element via which the connections are switchably connectable to one another; and
a timer;
wherein the network infrastructure device is configured to:
ascertain a particular time delay between a scheduled time of transmission for a datagram and an actual time of transmission of the datagram when forwarding datagrams associated with selected data streams, the selected data streams being associated with control applications running on communication terminals having timers,
send particular information about the ascertained time delay to a network infrastructure device or communication terminal which is subsequent along a path for a selected data stream, and
compute the scheduled time of transmission based on a particular time of reception of the datagrams and a time delay ascertained by a communication terminal or network infrastructure device which is precedent along the respective path;
wherein the timer and timers of the communication terminals are independent of timers of other communication terminals or other network infrastructure devices and are not synchronized to timers of other communication terminals or other network infrastructure devices.

21. A communication terminal, comprising:
a timer;
a processor; and
memory;
wherein the communication terminal is configured to:
achieve synchronization between transmission cycles of starting-node control applications and transmission cycles of end-node control applications by virtue of a starting-node control application taking a time delay ascertained by a precedent network infrastructure device including a further timer along a path for a selected data stream, an accumulated maximum time delay between starting nodes and end nodes and a time of transmission of datagrams associated with the selected data stream as a basis for ascertaining a particular start of a next end-node transmission cycle;
wherein the accumulated maximum time delay is ascertained for a transmission of the selected data stream; and
wherein the timer of the communication terminal and the further timer of network infrastructure device are independent of timers of other communication terminals or network infrastructure devices and are not synchronized to timers of other communication terminals or other network infrastructure devices.

\* \* \* \* \*